United States Patent Office 2,809,997
Patented Oct. 15, 1957

2,809,997

PENTACHLOROPHENYLTHIO-2,3-DIBROMO-PROPIONALDEHYDE

Howard Johnston, Concord, Calif., assignor to The Dow Chemical Company, Midland, Mich., a corporation of Delaware No Drawing. Application November 23, 1956, Serial No. 623,769

1 Claim. (Cl. 260—599)

This invention is directed to pentachlorophenylthio-2,3-dibromopropionaldehyde having the formula

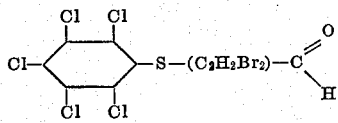

This new compound is a crystalline solid, somewhat soluble in many organic solvents and of very low solubility in water. It has been found to be active as a parasiticide and is adapted to be employed as an active toxic constituent of compositions for the control of fungal organisms such as *Fusarium oxysporum lycopersici* and *Rhizoctonia solani*.

The new compound may be prepared by reacting a pentachlorobenzenesulfenyl halide with acrolein to produce a pentachlorophenylthio-halopropionaldehyde intermediate having the formula

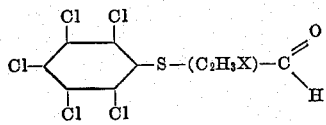

wherein X represents chlorine or bromine. This intermediate is then dehydrohalogenated with a dehydrohalogenating agent such as sodium carbonate, sodium bicarbonate or pyridine to obtain a pentachlorophenylthioacrolein of the formula

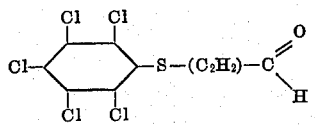

Bromination of this pentachlorophenylthioacrolein gives the desired pentachlorophenylthio-2,3-dibromopropionaldehyde.

In carrying out the first step in the present method, substantially equimolecular proportions of pentachlorobenzenesulfenyl chloride or bromide and acrolein are admixed in an inert organic solvent such as carbon tetrachloride, and the resulting mixture maintained for a period at a temperature of from 15° to 35° C. Following the reaction, the solvent may be removed by fractional distillation under reduced pressure to obtain the desired pentachlorophenylthio-halopropionaldehyde intermediate as a crystalline solid. This product may be purified by recrystallization from various organic solvents.

In the second step of the present method, the pentachlorophenylthio-halopropionaldehyde intermediate is dehydrohalogenated by treatment with an equimolar amount of the dehydrohalogenation agent in an inert solvent such as acetone or carbon tetrachloride. The dehydrohalogenation takes place readily at temperatures of from 30° to 60° C. with the formation of the desired pentachlorophenylthioacrolein product. This product is a crystalline solid and may be separated from the reaction mixture and purified in conventional fashion.

In the third step of the method, the pentachlorophenylthioacrolein is brominated in an inert organic solvent such as carbon tetrachloride or chloroform. In such operations, the bromine may be added portionwise to a solvent solution of the acrolein reactant or the latter reactant added portionwise to a solvent solution of bromine. The contacting is carried out with stirring and at a temperature of from 15° to 30° C. Good results are obtained when employing one molecular proportion of the acrolein reactant with at least one molecular proportion of bromine. Upon completion of the reaction, the reaction mixture may be fractionally distilled under reduced pressure to separate low boiling constituents and obtain the desired pentachlorophenylthio-2,3-dibromopropionaldehyde product as a crystalline solid residue. This product may be purified by recrystallization from various organic solvents.

The following example illustrates the invention but is not to be construed as limiting:

Example 1

Freshly distilled acrolein in the amount of 23 grams (0.42 mole) was added gradually with stirring to a solution of 95 grams (0.3 mole) of pentachlorobenzenesulfenyl chloride in 350 milliliters of carbon tetrachloride. The addition was carried out over a five-minute period and at room temperature. The reaction mixture was then allowed to stand for several days during which time a white solid formed. This solid was separated by filtration to obtain a pentachlorophenylthio-chloropropionaldehyde product which when dried melted at 106°–108° C. This product was obtained in a yield of 96.4 percent.

Twenty-three grams (0.723 mole) of the above product was dissolved in 100 milliliters of acetone and the resulting solution heated at the boiling point for 5 minutes. Ten grams of sodium bicarbonate was then added portionwise with stirring over a fifteen-minute period during which time the mixture was maintained at the boiling temperature. Upon cooling the reaction mixture, a pentachlorophenylthioacrolein product precipitated therein as a white solid. This product was removed by filtration, washed with water and dried. The dried product melted at 128°–129° C. and contained 52.2 percent chlorine and 9.37 percent sulfur as compared to the theoretical contents of 52.70 and 9.53 percent, respectively. The product was obtained in a yield of 94 percent based upon the propionaldehyde starting material.

A solution of 25 grams of bromine in 40 milliliters of chloroform was added dropwise with stirring to a solution of 51 grams of the above prepared pentachlorophenylthioacrolein product dissolved in 200 milliliters of chloroform. The addition was carried out over a period of 10 minutes and at a temperature of 25° C. The chloroform was thereafter evaporated from the reaction mixture to obtain 74 grams of a pentachlorophenylthio-2,3-dibromopropionaldehyde product as a white solid residue. This product was thereafter recrystallized from a hexane-benzene mixture. The recrystallized product melted at 115°–117° C. and contained 31.45 percent bromine and 6.38 percent sulfur as compared to the theoretical contents of 32.22 and 6.44 percent, respectively. The product was soluble in chloroform, methyl chloride, warm benzene, warm acetone and hot hexane.

The pentachlorophenylthio-2,3-dibromopropionaldehyde product is useful as a bactericide and is adapted to be employed in germicidal and disinfectant compositions for the control of many bacterial and fungal organisms. For such use the product may be dispersed on a finely divided carrier and employed as a dust. It may also be employed in oils, or as a constituent of aqueous emulsions or dispersions. In a representative operation, the pentachlorophenylthio-2,3-dibromopropionaldehyde product was dispersed in an aqueous suspension comprising the spores of *Rhizoctonia solani* to prepare a spore suspension containing 10 parts by weight of the propionaldehyde per million parts by weight of ultimate mixture. After 24 hours, the suspension was plated in a nutrient agar and the plates incubated for three days at 25° C. Inspection of the plates following the incubation period showed that the propionaldehyde product had given a 100 percent control of *Rhizoctonia solani*.

Pentachlorobenzenesulfenyl chloride used as a starting material in the present invention is prepared by the reaction of chlorine with pentachlorobenzenethiol. In carrying out the reaction, the chlorine is added portionwise to the thiol dissolved in an inert organic solvent such as carbon tetrachloride or hexane. The addition is carried out with stirring and at a temperature of from 20° to 40° C. Good results are obtained when at least one molecular proportion of chlorine is employed with each molecular proportion of pentachlorobenzenethiol. Upon completion of the reaction, the reaction mixture is fractionally distilled under reduced pressure to separate reaction solvent and obtain the desired product as a crystalline residue which may be purified by recrystallization from organic solvents.

I claim:

Pentachlorophenylthio - 2,3 - dibromopropionaldehyde which when purified melts at from 115° to 117° C.

No references cited.